United States Patent [19]
Kitai et al.

[11] 3,962,709
[45] June 8, 1976

[54] EXPOSURE TIME CONTROL CIRCUIT

[75] Inventors: Kiyoshi Kitai, Tokyo; Yukio Nakamura, Yotsukaido; Hiroaki Ishida, Yotsukaido; Shinji Nagaoka, Yotsukaido, all of Japan

[73] Assignee: Seiko Koki Kabushiki Kaisha, Japan

[22] Filed: Dec. 17, 1974

[21] Appl. No.: 533,537

Related U.S. Application Data

[63] Continuation of Ser. No. 377,933, July 10, 1973.

[30] Foreign Application Priority Data

July 10, 1972  Japan.............................. 47-68842

[52] U.S. Cl.................................. 354/51; 354/53; 354/60 R; 354/60 E
[51] Int. Cl.².................... G03B 7/08; G03B 17/18
[58] Field of Search............. 354/51, 53, 60 R, 60 E

[56] References Cited
UNITED STATES PATENTS

| | | | |
|---|---|---|---|
| 3,324,779 | 6/1967 | Nobusawa et al. | 354/51 |
| 3,418,477 | 12/1968 | Schmitt | 354/51 |
| 3,616,731 | 11/1971 | Rentschler | 354/60 E |
| 3,675,548 | 7/1972 | Kikuchi et al. | 354/51 |
| 3,750,540 | 8/1973 | Yanagisawa et al. | 354/51 |

Primary Examiner—L. T. Hix
Assistant Examiner—Russell E. Adams, Jr.
Attorney, Agent, or Firm—Robert E. Burns; Emmanuel J. Lobato; Bruce L. Adams

[57] ABSTRACT

An exposure time control circuit for a camera shutter having a light-responsive element that controls charging of a capacitor as a function of the intensity of the light from a scene to be photographed. The charge of the capacitor at a certain level activates a switching circuit that initiates closing of the camera shutter. A light-intensity indicating circuit is directly connected to the light-responsive element for indicating the intensity of the light received from a scene to be photographed so that the camera shutter speed may be set accordingly. Photographic exposure and light readings are taken independently with control switches that need not make use of a change-over switch for connecting and disconnecting the light-intensity indicating circuit to the light-responsive element.

3 Claims, 3 Drawing Figures

EXPOSURE TIME CONTROL CIRCUIT

This is a continuation of application Ser. No. 377,933, filed July 10, 1973.

BACKGROUND OF THE INVENTION

This invention relates generally to camera shutters and more particularly to an exposure time control circuit for a camera shutter.

Camera shutter control circuits are well known. These known circuits are constructed with a change-over switch that is operable to one position for operation of the control circuit in which the exposure time is automatically controlled as a function of the intensity of the light received by a light-responsive element in the circuit. The change-over switch is operable to a second position in which a light-intensity indicating circuit is selectively placed in circuit with the light-responsive element so that light readings can be taken for properly setting the shutter speed.

These known circuits have a serious problem in that the existance of the change-over switch introduces a reliability factor in controlling the exposure time. That is the reliability of the change-over switch may affect the two modes of operation.

SUMMARY OF THE INVENTION

It is a principal object of the present invention to provide an exposure time control circuit free of a conventional changeover mode of operation.

Another object is to provide an exposure time control circuit in which the number of switches is reduced, thereby increasing its reliability.

The exposure time control circuit according to the invention comprises a power source for energizing the control circuit and has a switching circuit that controls de-energization of an electromagnet that controls the closing of the shutter. The switching circuit is activated by a signal from a capacitor when the charge therein reaches a predetermined level.

The charging of the capacitor is controlled by a photoconductive cell that varies the charging rate as a function of the intensity of light received from the scene to be photographed.

A light-intensity indicating circuit is directly connected to the photoconductive cell and has an ammeter that will indicate the current flow through the cell which is representative of the light intensity of the scene to be photographed. Switch means alternatively place the capacitor in circuit for charging, thereof to control the exposure time and for short-circuiting the capacitor, and independently of the charging of the capacitor, taking a reading of the intensity of the light being sensed by the cell so that the shutter speed may be properly set.

BRIEF DESCRIPTION OF THE DRAWINGS

Other features and advantages of the exposure time control circuit in accordance with the present invention will be better understood as described in the following specification and appended claims in conjunction with the drawings in which:

DESCRIPTION OF THE PREFERRED EMBODIMENTS

Figure 1:
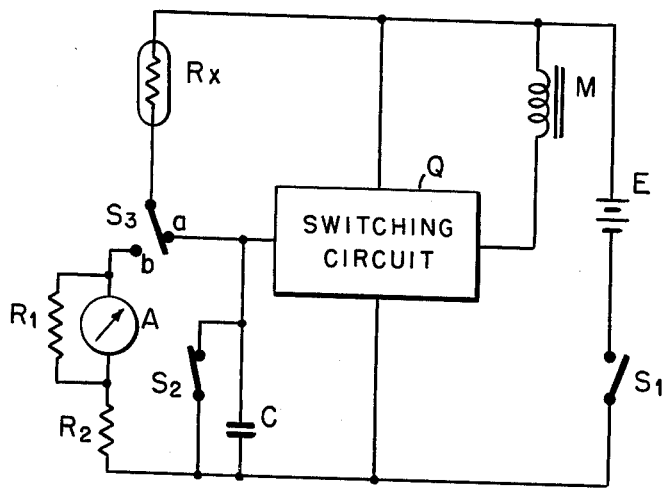
FIG. 1 is a schematic of an exposure time control circuit according to the prior art.

A conventional circuit is shown in FIG. 1 wherein a power source E has a normally open, power switch $S_1$ is connected thereto in series and across which is connected a switching circuit Q in parallel with a light detecting circuit and a light-intensity indicating circuit combination in series. The light-detecting circuit comprises a photoconductive cell $R_x$ having a terminal connected to a positive terminal of the power source E. This photoconductive cell detects or receives light from the object or field being photographed and current flow therethrough is a function of the intensity of the light received from the field of the photographic exposure.

A change-over switch $S_3$ is connected in series with the photoconductive cell and has a movable contact actuated by a separate button for actuating it. The switch is normally in the position shown in FIG. 1 with the movable contact containing a fixed contact a for controlling the charging of a capacitor C connected to the input side of the switching circuit Q. A normally closed charging-switch S2 short circuits the capacitor C.

A light-intensity indicating circuit or light meter is connected to a fixed contact b of the change-over switch $S_3$ and the power switch $S_1$. This light-intensity indicating circuit includes the cell and has an ammeter A in series with the photoconductive cell. A shunt resistor $R_1$ and a series resistor $R_2$ are compensating resistors for the ammeter.

When an exposure light reading is to be taken the separate button actuating the change-over switch is depressed and actuated so that the second contact b is closed and the light-intensity indicating circuit is placed in series with the photoconductive cell. The power switch $S_1$ is then closed by a separate button and an exposure, is of course not taken, but the photocell $R_x$ will pass current indicating the intensity of the light from the field or object intended to be photographed. The ammeter will indicate this intensity and the necessary camera shutter speed adjustments can be made. The change-over switch $S_3$ is placed in the condition shown in FIG. 1 when taking an exposure.

With the shutter control circuit in the condition shown in FIG. 1 when the camera button, not shown, for taking an exposure is actuated the power switch $S_1$ is closed and an interlink which is the shutter opening mechanism, between the power switch and the discharging switch $S_2$ opens the latter switch so that the capacitor is no longer shorted. The capacitor is then charged at a rate which is a function of the light sensed, as before described, by the photocell which controls the charging of the capacitor.

When the camera button is depressed for taking an exposure the shutter is opened and held open by an electromagnet M connected on the output side of the switching circuit Q. The electromagnet must be de-energized to allow the shutter-closing mechanism, not shown, to close the shutter when the shutter exposure delay time is terminated. Thus when the charge in the capacitor reaches a predetermined value the switching circuit Q is actuated to control de-energization of the electromagnet and the shutter closed so that a photographic exposure is completed with the proper exposure delay time.

Figure 2:
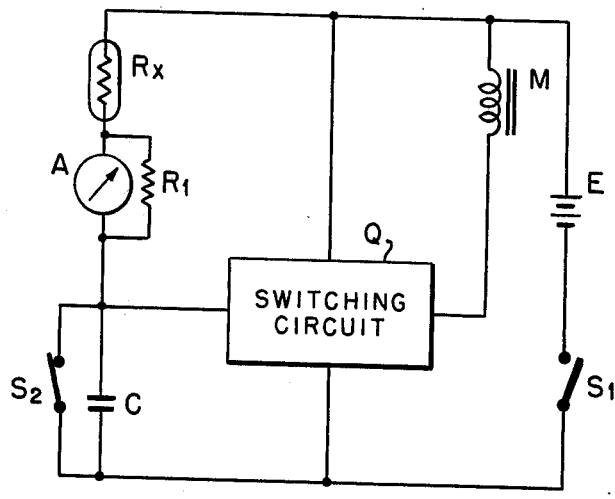
FIG. 2 is a schematic of an exposure time control circuit according to the invention.
Figure 3:
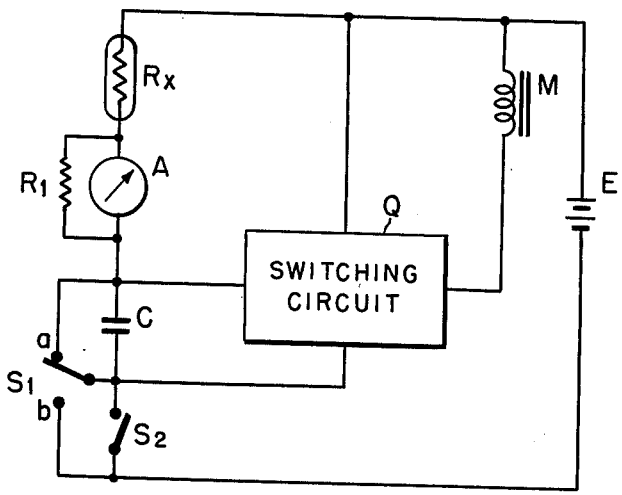
FIG. 3 is a schematic of an exposure time control circuit embodying a second embodiment of the invention.

Embodiments of the control circuits embodying the invention are shown in FIGS. 2 and 3. In these two FIGS. The same reference letters are used for alike or similar components and correspond to those used for these components in FIG. 1 so that the circuits can be easily understood and compared.

The circuit in FIG. 2 has a power source E, power switch $S_1$ switching circuit Q, photoconductive cell $R_x$, a capacitor C and a discharging switch $S_2$ all connected as in the circuit in FIG. 1. The light-intensity indicating circuit is different and comprises an ammeter A permanently connected in series with the photoconductive cell and a compensating resistor $R_1$ shunts the ammeter. The resistance of the ammeter and its shunt resistor are sufficiently low as compared to the internal resistance of photoconductive cell so that their resistance is negligible and it has no influence on the exposure time control circuit of the invention.

This embodiment has no change-over switch and the light-intensity indicating circuit is connected to the photocell and to a junction to which the capacitor C, the discharging switch $S_2$ and the switching circuit Q are connected.

When an exposure is to be taken the power switch is closed by actuating the camera exposure button or lever, not shown. The discharging switch $S_2$, which is normally closed, is linked to the shutter-opening mechanism and is opened so that the capacitor C is charged under control of the photoconductive cell, sensing the light as before described, and the switching circuit is actuated so that a proper exposure is taken by de-energizing the electromagnet M.

When a light reading is to be taken the power switch $S_1$ and the capacitor discharging switch $S_2$ are closed manually by separate buttons without actuation of the camera exposure or release button. The capacitor is short circuited and the shutter is not opened.

The capacitor is not charged. The light-intensity circuit is then completed since power is applied to the photocell and the ammeter reads the current flow through the photocell. The light reading can then be used for setting the shutter speed.

The second embodiment of the exposure control circuit according to the invention in FIG. 3 has a power source E, a switching circuit Q, an electromagnet M, a photoconductive cell $R_x$ connected the same as in FIG. 1 and functioning the same. In this circuit a light-intensity indicating circuit, constituting an ammeter A and its compensating resistor $R_1$, is connected as in the circuit in FIG. 2.

A capacitor C is connected in series with the photocell and the ammeter at a junction to which it is connected to the input of the switching circuit Q. In this circuit a switch $S_2$, is in series with the capacitor and is normally open instead of closed as in the other embodiments. A power switch $S_1$ is constructed as a change-over switch having a stationary contact a, normally closed by the movable contact, connected to the junction between the capacitor C and the light-intensity indicating circuit.

The switch $S_2$ in series with the capacitor is not a discharging switch as in the other embodiments. It is a second power switch. When the circuit is in its normal condition as illustrated in FIG. 3 this second power switch $S_2$ is actuatable by a separate button and is closed for taking a light reading. It can be seen that when it is closed the capacitor is short circuited by the change-over switch $S_1$ so that the ammeter will indicate the light intensity and the shutter speed may be accordingly adjusted. Release of this button, not shown allows this second power switch or light-intensity reading switch to return to an open position.

When an exposure is to be taken the exposure button or lever on the camera is actuated and this actuates the change-over switch or power switch $S_1$ so that its movable contact switches from the position in FIG. 3 to where it closes a second fixed contact b which is in series with the power source. This will apply power to the circuit. Since the capacitor is no longer short circuited it will be charged under control of the photoconductive cell and an exposure will be taken as before described with the proper exposure time delay.

Thus it can be seen that both embodiments of the invention reduce the number of switches and provide positive means for taking light readings and photographic exposures.

What I claim and desire to secure by Letters Patent is:

1. An exposure time control circuit for a shutter comprising, a power source, a switching circuit connected across the power source, a capacitor for applying a signal to the switching circuit for effecting closing of the shutter, a light-detecting circuit comprising a light-responsive element connected to said power source for varying charging of said capacitor as a function of the intensity of light sensed from an exposure scene that is to be photographed to thereby control the shutter exposure time, a light-intensity indicating circuit connected directly in series with said light-detecting circuit light-responsive element and in series with said capacitor to indicate the value of the current passing through said light-responsive element and representative of the intensity of the light sensed by said light-responsive element, and switch means connected in parallel with said capacitor for short circuiting said capacitor and operable to alternatively place the capacitor in circuit with said light-responsive element for charging thereof to a predetermined level and for taking the capacitor out of circuit and for independently of control of the charging of said capacitor taking a reading of the intensity of the light being sensed by said light-responsive element, said light-intensity indicating circuit comprising said light-responsive element and an ammeter connected directly to said light-responsive element to receive the output thereof directly and a resistor shunting the ammeter, and said resistor and said ammeter having a resistance considerably less than the internal resistance of said light-responsive element.

2. An exposure time control circuit for a camera shutter according to claim 1, in which said switch means comprises a power switch connected for controlling application of power to the control circuit from said power source, and a switch closed independently of the power switch for controlling taking of light readings by said light-intensity indicating circuit.

3. An exposure time control circuit for a camera shutter according to claim 1, in which said switch means comprises a change-over switch for applying power to the control circuit from said power operable to a first operative position applying power to said light-responsive element for charging of said capacitor and to a second operative position for short-circuiting said capacitor, and a second switch normally open actuatable to a closed position independently of said change-over switch for taking a light reading through said ammeter when said change-over switch is in said second operative position.

\* \* \* \* \*